No. 895,761. PATENTED AUG. 11, 1908.
F. M. HUNTOON.
SOLAR WATER HEATER.
APPLICATION FILED AUG. 8, 1907.
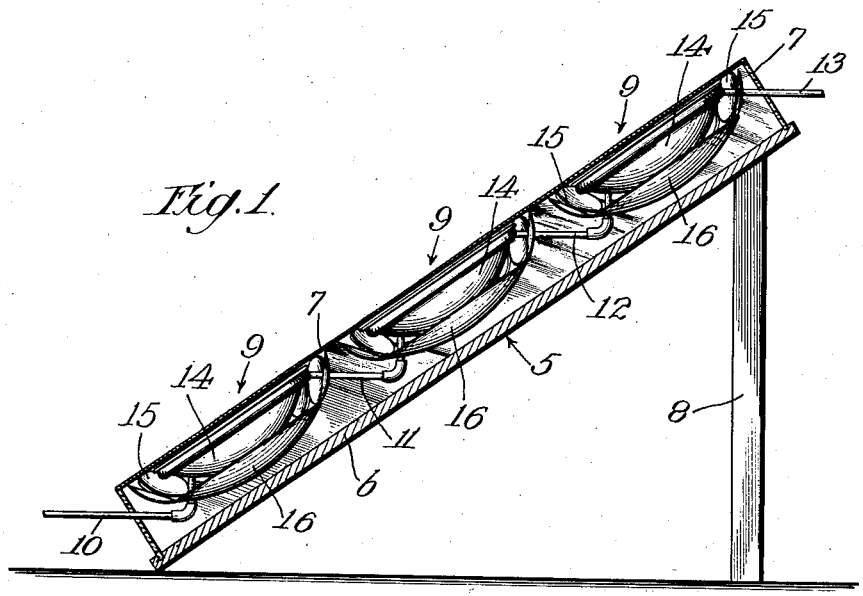
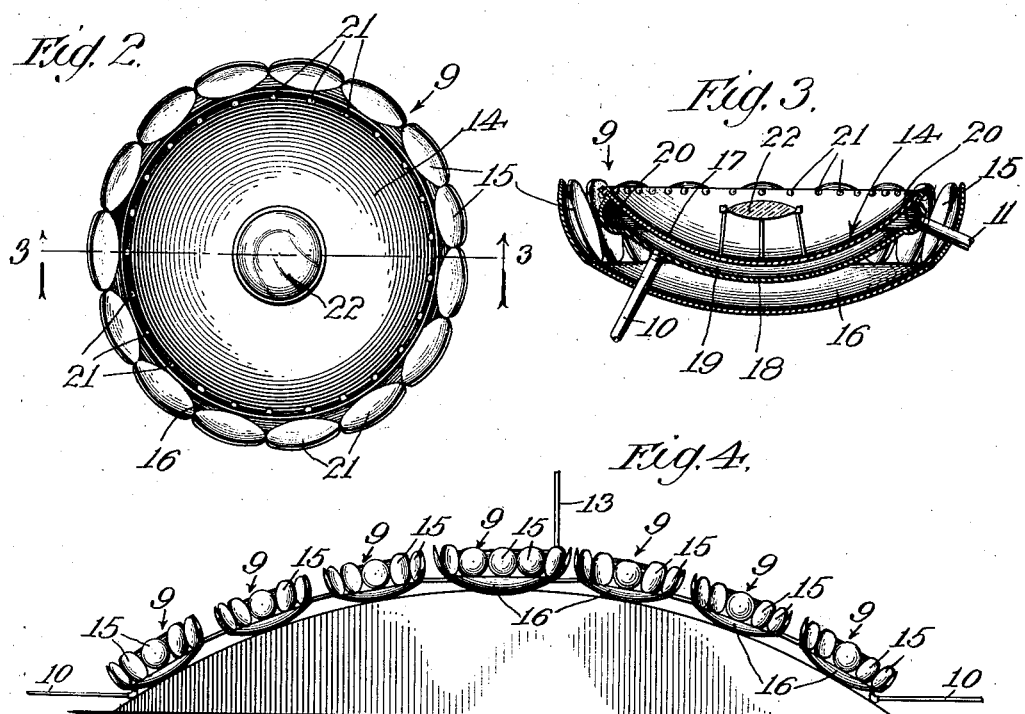
Witnesses:
Inventor:
Fred M. Huntoon,
By Attorneys

UNITED STATES PATENT OFFICE.

FRED M. HUNTOON, OF RIVERSIDE, CALIFORNIA.

SOLAR WATER-HEATER.

No. 895,761.      Specification of Letters Patent.      Patented Aug. 11, 1908.

Application filed August 8, 1907. Serial No. 387,574.

*To all whom it may concern:*

Be it known that I, FRED M. HUNTOON, a citizen of the United States, residing at Riverside, county of Riverside, State of California, have invented new and useful Improvements in Solar Water-Heaters, of which the following is a specification.

My invention relates to improvements in that class of solar heaters in which Patent No. 842,788 was granted to me December 21, 1906, and an object thereof is to provide a novel arrangement of the units of the heater whereby the water passing through the units is heated to a high temperature.

A further object is to provide a novel arrangement of reflectors around the individual units in order to concentrate the heat of the sun's rays upon the water passages.

I accomplish these objects by means of the device described herein and illustrated in the accompanying drawing in which:—

Figure 1,—is a sectional elevation of a heater constructed in my improved form and composed of three units. Fig. 2,—is a plan view of one of the units. Fig. 3,—is a cross section taken on line 3—3 of Fig. 2. Fig. 4,—is an elevation of a modified arrangement of units.

In the drawings 5 designates a case composed of a preferably wooden base 6 and glass sides and top 7 and which is preferably held by a support 8 at such an angle as is shown in Fig. 1 so that the case will face the sun during the hottest part of the day. This angle obviously will vary to suit varying latitudes. Case 5 contains a plurality of heating units 9, which I have shown as three in number, although there may be more or less, as individual conditions demand. Inlet pipe 10 enters at the bottom of case 5 and connects with the lowermost unit 9, a pipe 11 leading from this unit to the unit immediately above it, a second pipe 12 connecting the middle unit to the uppermost unit and discharge pipe 13 leading from the heater to any convenient location. Units 9 are essentially composed of a spherical heating receptacle 14 for the passage of water and a series of reflectors 15 arranged around the receptacle with a large reflector 16 underneath the receptacle. The receptacle is formed of two sheets of metal 17 and 18 pressed into a spherical shape and having between them a shallow passage way 19 into which the inlet and discharge pipes open. The inlet pipe feeds to the lowest point of the receptacle as shown in Fig. 1, and the outlet pipe discharges from the highest point. An annular space 20 is provided near the upper face of the receptacle by an enlargement of sheet 19 at that point and the discharge pipe connects directly to this annular space. The two sheets are secured together by rivets 21 at their outer edges. A double convex lens 22 is supported over the center of the receptacle to concentrate the heat upon a central point of the receptacle as in my former patent above referred to.

Directly beneath the receptacle is a large reflector 16 preferably formed of polished tin plate, although other materials, such as silvered glass, speculum metal or sheet tin may be used. Arranged around the periphery of reflector 16 is a series of smaller reflectors 15 adapted to concentrate the heat of the sun's rays upon the receptacle. By this arrangement of reflectors it will be manifest that the heat of the sun's rays will be thrown upon the water receptacle even when the sun is low in the heavens, as the reflectors furthest from the sun will reflect its rays onto the receptacle.

In Fig. 4 I have shown an arrangement of units on the arc of a circle, the water feeding in at both the lowermost units and discharging from the central and highest unit. This arrangement is particularly effective as it enables the heater to be placed in a position so that the sun will play directly upon some of the units during the entire day. By the arrangement of the several units in series as illustrated I am enabled to heat the water passing therethrough to a much higher temperature than is the case where the water passes through only one heating unit. This arrangement in conjunction with the thin sheet of water in the heated passageway enables me to provide a solar heater of high efficiency and of uniform operation. The arrangement of reflectors around the heating units renders my heater operative for a long period during each day, as the reflected rays of the sun are thrown upon the water passages even when the sun is at a great angle from the axis of the heating units.

Having described my invention what I claim as new and desire to secure by Letters Patent is:—

1. In a solar heater a water receptacle comprising two metallic sheets of spherical configuration secured together at their outer edges so as to leave a uniform space between them, means to feed water through said space, a spherical reflector arranged beneath said water receptacle, and a plurality of reflectors arranged around said water receptacle.

2. In a solar heater a plurality of water receptacles arranged on an arc of a circle, reflectors arranged around each of said receptacles, and water connections between said receptacles so that water may be fed to the lowermost receptacles and discharged from the uppermost receptacle.

3. In a solar heater a water receptacle comprising two metallic sheets of spherical configurations secured together at their outer edges, and spherical reflectors arranged around and beneath said receptacle.

4. A solar heater comprising a plurality of units arranged one above the other, said units being connected together in series and each of said units comprising two metallic sheets of spherical configuration secured together at their outer edges so as to leave a uniform space between them, means to feed water through said space, a spherical reflector arranged beneath said water receptacle, and a plurality of reflectors arranged around said water receptacle.

In witness that I claim the foregoing I have hereunto subscribed my name this 29th day of July, 1907.

FRED M. HUNTOON

Witnesses:
WILLIAM DOUGLAS,
F. G. HALL.